United States Patent [19]

Kubota et al.

[11] 4,223,358

[45] Sep. 16, 1980

[54] METHOD AND APPARATUS FOR CANCELLING THE REMANENT DEFLECTION IN A PIEZOCERAMIC HEAD SUPPORT MEANS OF A VIDEO RECORDER

[75] Inventors: Yukio Kubota, Tokyo; Keiko Noji, Kawasaki; Yoshimi Watanabe, Yokohama, all of Japan

[73] Assignee: Sony Corporation, Tokyo, Japan

[21] Appl. No.: 34,765

[22] Filed: Apr. 30, 1979

[51] Int. Cl.² .................. G11B 21/02; G11B 21/10
[52] U.S. Cl. ........................... 360/75; 360/77; 360/10
[58] Field of Search ............... 360/75, 77, 70, 9, 10

[56] References Cited

U.S. PATENT DOCUMENTS

| 4,143,405 | 3/1979 | Kubota | 360/77 |
| 4,148,082 | 4/1979 | Okada et al. | 360/77 |

*Primary Examiner*—Robert S. Tupper
*Attorney, Agent, or Firm*—Lewis H. Eslinger; Alvin Sinderbrand

[57] ABSTRACT

A method and apparatus for cancelling remanent deflection in a piezoceramic head support means which is used in a video recorder that is operative in selected operating modes. In one of such modes, such as the reproducing mode, a tracking control signal is supplied to the piezoceramic support means, thereby causing the piezoceramic support means to deflect and to correspondingly displace the head supported thereby in a direction transversely of the trace which is scanned by that head. When the video signal recorder is changed over between selected operating modes, an oscillating signal is supplied to the piezoceramic support means for a predetermined duration, the maximum magnitude of the oscillating signal being less than $E_c$, wherein $E_c$ is the largest magnitude of the tracking control signal to which the piezoceramic means responds. The magnitude of the oscillating signal is gradually reduced to a minimum level during this predetermined duration.

20 Claims, 14 Drawing Figures

METHOD AND APPARATUS FOR CANCELLING THE REMANENT DEFLECTION IN A PIEZOCERAMIC HEAD SUPPORT MEANS OF A VIDEO RECORDER

BACKGROUND OF THE INVENTION

This invention relates to video signal recorders and, more particularly, to a method and apparatus for cancelling the remanent deflection which is present in the piezoceramic head-support device of such a recorder.

Recently, piezoceramic support assemblies, such as a monomorph support leaf and a bimorph support leaf, have been designed to support the scanning transducer, or head, in a video signal recorder, such as a video tape recorder (VTR). The piezoceramic support device is responsive to a control voltage applied thereacross to deflect in a direction and by an amount which is determined by the polarity and magnitude of the control voltage supplied thereto. Thus, during a reproducing mode of the VTR, for example, if the head which then is scanning a previously recorded record track deviates from that track, the piezoceramic support device is controlled to deflect by a specified amount so that the head which is supported thereby is displaced by the same amount and, hence, is brought into proper tracking alignment with the record track which it is scanning. By properly controlling the piezoceramic support device, mis-tracking errors in a normal reproducing mode, as well as in various special reproducing modes, such as the stop-motion mode, the slow-motion mode, the quick-motion mode, and the like, can be minimized. As a consequence of minimizing such mis-tracking errors, the video picture which ultimately is reproduced is of desirable quality. An example of VTR systems in which a piezoceramic support device is used is disclosed in U.S. Pat. Nos. 4,165,521 and 4,163,994. Examples of the material which can be used to construct the piezoceramic support device are described in *Journal of Applied Physics*, Volume 46, No. 1, January 1975, pages 222–229; and in the paper "Effects of Ageing and Compressive Stress on the Properties of BaTiO$_3$ Ceramics" by N. J. Poole, *Journal of Physics* (Great Britain), Volume 8, 1975.

When a piezoceramic support device, such as a bimorph leaf assembly constructed of two piezoceramic leaves whose directions of polarization are opposite to each other, is supplied with a control voltage of given polarity, the piezoceramic support device bends, or deflects, in a direction which is determined by that polarity. If the polarity of the control voltage is reversed, the direction of deflection likewise is reversed. During a reproducing operation, it is expected that a tracking control voltage of changing magnitude and polarity will be applied to the piezoceramic support device to correct for mis-tracking errors. It has been found that the piezoceramic material exhibits hysteresis. That is, as the tracking control voltage increases, a first amount of deflection will be produced in response to a tracking control voltage of a predetermined level, but then, as the tracking control voltage is reduced, when that level of voltage once again is reached, a second, greater (or lesser) amount of deflection will be obtained therefor. Because of this hysteresis, a residual, or remanent deflection, will be present even if the tracking control voltage is reduced to zero. This means that, when the tracking control voltage is removed from the piezoceramic support device, the head which is supported thereon will not return to its "home" position.

In view of the foregoing phenomenon of remanent deflection, referred to hereinafter merely as remanence, a mis-tracking error may result during a reproducing operation because of the failure of the piezoceramic support device to respond to the tracking control voltage supplied thereto in the manner for which the tracking control system had been designed. For example, if the VTR is operated during an edit operation, previously recorded video signals first will be played back, and then new, additional information will be recorded. Because of the remanence of the piezoceramic support device, the pitch between the last track which is played back and the first track which is recorded may be either too large or too small. This discrepancy is attributed to the fact that, during the recording section of the edit operation, no tracking control voltage is applied to the piezoceramic support device, and the head supported thereon is expected to return to its home position for recording. The discontinuity between the previously recorded and newly recorded tracks is due to the failure of the head to return to its home position. As another example, if the VTR is a so-called two-head recorder, and if it is operated in the edit mode, as before, then one piezoceramic support device may be deflected in one direction, for example, in the upward direction, while the other piezoceramic support device is deflected in the opposite direction in order to correct for mis-tracking errors during the reproducing mode of the edit operation. If, after the last track is played back, the VTR is changed over to its recording mode wherein no tracking control voltage is supplied to the piezoceramic support devices, the remanence of these devices will result in one head being displaced upward from its home position and the other head being displaced downward from its home position. The pitch of the tracks which then are recorded by such heads will be non-uniform, wherein the spacing between adjacent tracks will be greater-than-normal, followed by less-than-normal, followed by greater than-normal, and so on.

OBJECTS OF THE INVENTION

Therefore, it is an object of the present invention to provide an improved method and apparatus for cancelling the remanence in a piezoceramic support device of the type which is used in signal recording/reproducing apparatus.

Another object of this invention is to provide a method and apparatus for controlling the piezoceramic support device of, for example, a VTR, so as to return the transducer, or head, of that VTR to its home position in the absence of a tracking control voltage supplied thereto.

A further object of this invention is to provide a dynamic tracking control system for use in a signal recorder/reproducer, such as a VTR, wherein the scanning head or heads are controlled to scan tracks of uniform pitch during both a reproducing mode and a recording mode, regardless of the inherent remanence of the piezoceramic head support device.

An additional object of this invention is to provide improved apparatus which overcomes the aforenoted problems of the prior art.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for cancelling the remanent deflection, or remanence, in a piezoceramic support device for a transducer which is used to scan successive traces across a recording medium in, for example, a video signal recording and/or reproducing apparatus. The apparatus is operative in selected operating modes, in one of which a tracking control signal is supplied to the piezoceramic support device to minimize mis-tracking of the transducer. A source of oscillating signal of magnitude substantially greater than the magnitude of the tracking control signal is provided. When the recording and/or reproducing apparatus is changed over between selected operating modes, the oscillating signal is supplied to the piezoceramic support device for a predetermined duration. The magnitude of the oscillating signal, which is less than $E_c$, wherein $E_c$ is the largest magnitude of the tracking control signal to which the piezoceramic support device responds, is gradually reduced to a minimum level during this predetermined duration. In one embodiment, the oscillating signal of gradually reduced magnitude is supplied to the piezoceramic support device when the recording and/or reproducing apparatus is changed over from a reproducing mode to a stand-by mode. In another embodiment, the oscillating signal of gradually reduced magnitude is supplied to the piezoceramic support device when the apparatus is changed over to a recording mode. Preferably, the maximum magnitude of the oscillating signal is within the range $0.25E_c$ to $0.75E_c$.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
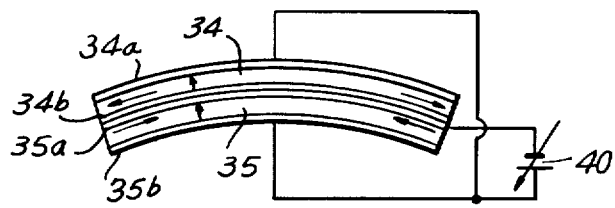
FIG. 1 is a schematic side view of a piezoceramic support device which can be used with the present invention.

Referring now to the drawings, FIG. 1 is a schematic side view of a piezoceramic support member which can be used with the present invention. This piezoceramic support member is adapted to support a transducer, such as a magnetic recording and/or reproducing head, and is formed of piezoceramic material which is responsive to a voltage applied thereto so as to bend of deflect. In the example illustrated in FIG. 1, the piezo-ceramic support member is a so-called bimorph leaf assembly formed of a pair of leaf members 34 and 35, each being constructed of piezoceramic material whose directions of polarization are represented by the illustrated arrow. The opposite surfaces of piezoceramic leaf member 34 are plated with electrodes 34a and 34b, respectively; and the opposite surfaces of piezoceramic leaf member 35 likewise are plated with electrodes 35a and 35b, respectively. Piezoceramic leaf members 34 and 35 are disposed in overlying, face-to-face relationship such that electrodes 34b and 35a are on contact. When assembled in this manner, the bimorph assembly will deflect if a variable voltage is applied across the respective members. For example, if a voltage source 40 supplies a voltage of relatively positive polarity to electrode 35b, relative to the voltage applied to electrode 35a, and if this same positive polarity voltage is applied to electrode 34a, relative to electrode 34b, then the bimorph leaf assembly tends to bend, or deflect, in the illustrated direction. That is, piezo-ceramic leaf member 34 tends to expand in its lengthwise direction while piezoceramic leaf member 35 tends to compress. As a result of these oppositely-acting forces, the bimorph leaf assembly deflects as shown, and by an amount which is a function of the strength of the electric field applied across each member. That is, the magnitude and direction of deflection of the bimorph leaf assembly is a function of the magnitude and polarity of the voltage applied thereto by voltage source 40. If the polarity of the voltage supplied across the bimorph leaf assembly is reversed, that is, if the polarity of the voltage supplied by source 40 is opposite to that which is illustrated, the direction in which the bimorph leaf assembly deflects correspondingly is reversed.

In FIG. 1, a voltage is supplied from source 40 in common with electrodes 34b and 35a. If the direction of polarization of the piezoceramic members is made opposite to each other, that is, if electrodes 34a of piezoceramic member 34 is placed in contact with electrode 35a of piezoceramic member 35, then the voltage produced by source 40 can be supplied across the exposed electrodes of the bimorph leaf assembly, and those electrodes which are in contact with each other need not be supplied with a common, or reference voltage. Reference is made to the bimorph leaf assembly which is disclosed in U.S. Pat. No. 4,141,047 filed Sept. 12, 1977.

Figure 2A:
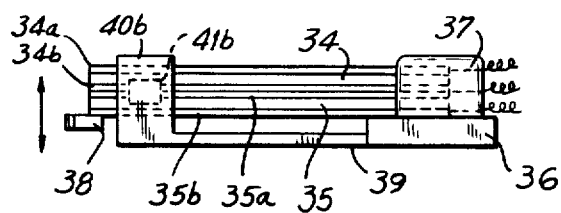
FIG. 2A is a side view of one embodiment of a piezoceramic head support assembly which can be used with the present invention.
Figure 2B:
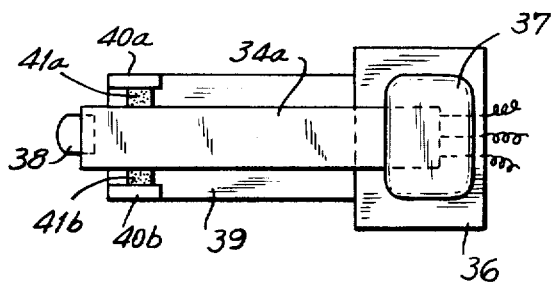
FIG. 2B is a top view of the assembly shown in FIG. 2A.

The piezoceramic support member shown in FIG. 1 is used as a head support device in accordance with the construction shown in FIGS. 2A and 2B, which are side and top views, respectively, of such a head support assembly. Although not shown, the head support assembly of FIGS. 2A and 2B is adapted to be mounted on the rotatable guide drum which generally is provided in a video signal recorder, such as a VTR, of the two-head or of the omega-wrap configuration. The head support assembly includes a mounting base 36 having a receiving section 37 projecting upwardly therefrom, the receiving section being adapted to receive the bimorph assembly which may be secured thereto by a suitable adhesive. The bimorph assembly extends outward from the mounting base in a direction generally parallel to a mounting plate 39, which also extends outwardly from base 36. Preferably, tabs 40a and 40b extend upwardly from mounting plate 39, and damping members 41a and 41b are attached to these respective tabs. Damping members 41a and 41b are provided to damp free or resonant oscillation of the bimorph assembly which may be caused by the forces exerted in response to the bending voltages applied to the respective electrodes. For example, if a dither oscillating voltage is applied across the bimorph leaf assembly, damping members 41a and 41b damp the resonant oscillation which otherwise might occur. This damping action is achieved because the damping members are pressed between the sides of the bimorph assembly and tabs 40a and 40b with suitable force to prevent oscillation but not so great as to prevent deflection of the bimorph assembly in response to the control voltage applied thereto. As illustrated in FIGS. 2A and 2B, head 38, which is the recording and/or reproducing transducer of the video recorder, is mounted to piezoceramic leaf member 35, as by securing the head to electrode 35b by a suitable adhesive. Respective conducting leads are connected to the corresponding electrodes of the bimorph leaf assembly such that this assembly is responsive to a voltage supplied thereto in the manner represented by FIG. 1.

Figure 3:
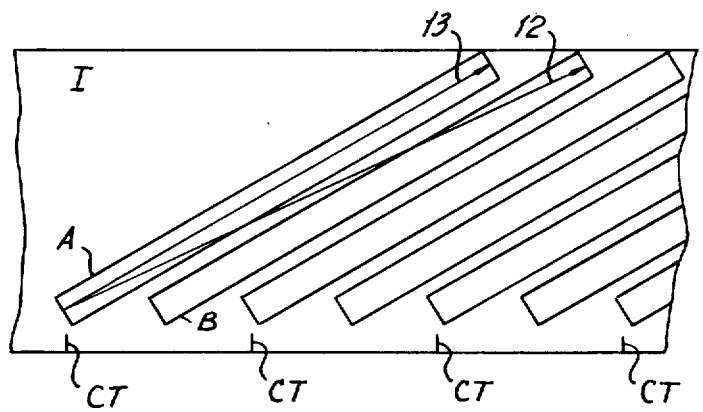
FIG. 3 represents the relationship between the scanning trace of a head relative to parallel record tracks on a recording medium.

FIG. 3 illustrates record tracks which are recorded in parallel, skewed relation on magnetic tape T. The video signals are recorded along these tracks by, for example, head 38. As is conventional, each track may contain a single field interval such that two adjacent tracks constitute a complete frame. Control pulses CT are recorded along a longitudinal edge of tape T, each control pulse representing the beginning of a frame, and being located adjacent the beginning of a track. These control pulses CT are used, during a reproducing operation, in a servo control circuit for synchronizing the movement of tape T to the rotation of the playback heads as such heads scan successive traces across the tape. Let it be assumed, for the purpose of the present discussion, that the video signal recorder is a VTR which includes two oppositely disposed heads for scanning alternate tracks A and B across tape T. Alternatively, the VTR may be of the so-called omega-wrap configuration containing one head. Let it be further assumed that the VTR is operative in various operating modes. For example, the VTR may be operative in a normal recording mode wherein the illustrated tracks and control pulses are formed on tape T. The VTR also may be operative in a reproducing mode in which the information which is recorded in the illustrated tracks is played back therefrom. This reproduced information can be transmitted or used in conjunction with other broadcast material; and ultimately is used to derive a video picture corresponding to the reproduced information. This reproducing mode may be a normal reproducing mode or one of various "special" reproducing modes. As examples of the latter are slow-motion, stop-motion, quick-motion, reverse-motion, and so on. Yet another operating mode of the VTR is the stand-by or ready mode wherein tape T is maintained stationary and head (or heads) 38 continues to rotate at its synchronized speed, but information is neither recorded nor reproduced from the tape. As an example, the stand-by mode may be assumed when the VTR is turned on, but neither the recording nor the reproducing mode is selected.

In general, if the same VTR is used to reproduce the information from tape T as was used to record that information, each scanning trace of the head (or heads) 38 during reproduction will coincide with the scanning trace of that head during recording. Even if there is some difference therebetween, the scanning trace during reproduction generally will be parallel to a record track. Proper alignment than can be attained merely by adjusting the speed at which tape T is transported so as to bring the scanning trace into coincidence with the track then being scanned. However, if tape T had been subjected to stretching or shrinkage subsequent to the recording of video information thereon, the scanning trace of the head (or heads) during reproduction may not be parallel to the record track. As a consequence thereof, without dynamic adjustment of the scanning trace, a mis-tracking error will be produced. A mistracking error also may be produced if a different VTR is used to reproduce the video information as was used to record that information.

In addition to the aforenoted mis-tracking errors which may be produced during a normal reproducing mode of operation, the scanning trace of the reproducing head (or heads) will not be in alignment with the record tracks during various special reproducing modes. For example, and as shown in FIG. 3, the head may follow scanning trace 13 during a normal reproducing mode, wherein tape T is transported at its normal, forward speed. However, during, for example, a stop-motion mode wherein tape T is maintained stationary, the head may follow scanning trace 12 across the tape. That is, as the head scans the tape, the beginning of its scanning trace is in proper alignment with one track, and then this scanning trace traverses the guard band between adjacent tracks and terminates in alignment with the next adjacent track. Without compensating scanning trace 12, the video picture which is reproduced during this scanning trace will be distorted.

If the head (or heads) is supported on the bimorph leaf assembly shown in, for example, FIGS. 2A and 2B, then a control voltage will be supplied to the bimorph assembly as the head scans tape T during, for example, the stop-motion mode, so as to bring scanning trace 12 into alignment with desired scanning trace 13. This control voltage may be a sawtooth shaped waveform whose amplitude increases as the head continues along its scanning trace. As a consequence of this control voltage, the bimorph assembly deflects, or bends, in a direction transverse to its scanning trace so as to displace the head in a corresponding direction, thereby bringing the head into alignment with the record track. Of course, the polarity of the control voltage which is supplied to the bimorph assembly determines the direction in which the head is laterally displaced. In the example just described, the head is displaced in the upward direction relative to its scanning trace. As an alternative, the bimorph leaf assembly may be deflected in the downward direction so as to bring scanning trace 12 into alignment with, for example, track B. In this embodiment, the control voltage, which also is of sawtooth shaped waveform, is of gradually reduced amplitude as the head continues along its scanning trace.

While FIG. 3 shows the relationship between scanning traces 12 and 13 for stop motion and normal modes of reproduction, other analogous scanning traces may be drawn to represent other special reproducing modes. In each of such special reproducing modes, the control voltage which is supplied to the bimorph assembly should be of the proper magnitude and polarity so as to maintain the scanning trace of the head in proper alignment with the track then being scanned. Generally, such a control voltage is a sawtooth shaped waveform.

Figure 4:
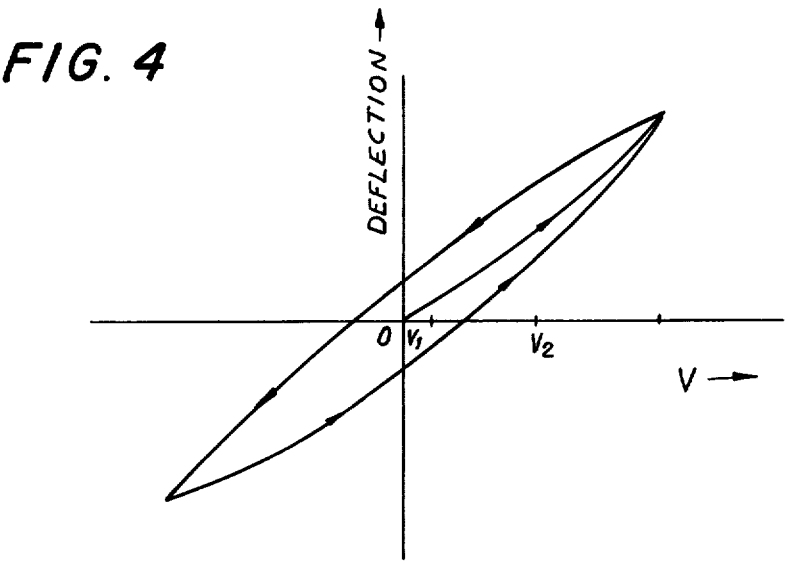
FIG. 4 represents the hysteresis of the piezoceramic support device which is used with the present invention.

It has been found that the piezoceramic support device, whether formed as a bimorph leaf assembly or as a monomorph leaf assembly, exhibits hysteresis. That is, the control voltage which is applied across the piezoceramic support device is increased, from, for example, a magnitude $V_1$ to a magnitude $V_2$, and passes through an intermediate magnitude $V_o$, the deflection of the piezoceramic support device in response to a voltage $V_o$ as this control voltage increases from $V_1$ to $V_2$ is not equal to the deflection thereof when the voltage $V_o$ once again is reached as the control voltage is reduced from $V_2$ to $V_1$. An example of the hysteresis curve for a typical piezoceramic material from which the piezoceramic support device is constructed is illustrated in FIG. 4. The abscissa represents the control voltage V and the ordinate represents the deflection of the piezoceramic support device. As also shown, once a control voltage is applied to the piezoceramic support device, the device generally will not return to its so-called "home" position of zero deflection when that control voltage is removed. This means that if the head which is supported on this piezoceramic support device is intended to exhibit zero displacement during, for example, a recording mode, the fact that the piezoceramic support device exhibits hysteresis means that, in the absence of a tracking control voltage, which is normal during the recording mode, a remanent or residual deflection remains in the piezoceramic support device so as to impart some undesired displacement to the head. As mentioned above, this remanence of the piezoceramic support device can result in a discontinuity between the tracks which are played back and the immediately following tracks which are recorded during an edit operation. This remanence also can result in non-uniform pitch in the successive traces of each head in a two-head VTR. All this results from the fact that the remanence of the piezoceramic support device prevents the head from returning to its home position even when a zero tracking control voltage is applied to the support device.

The purpose of the present invention is to remove or cancel the remanance of the piezoceramic support device. This invention proceeds upon the discovery that the remanence can be cancelled if the piezoceramic support device is supplied with a voltage which follows the hysteresis curve shown in FIG. 4, but with ever decreasing magnitude. That is, an oscillating voltage is supplied to the piezoceramic support device, this oscillating voltage commencing with a relatively high magnitude so that, during each half cycle thereof, the piezoceramic support device is deflected first in one direction and then in the other, and then the magnitude of this oscillating signal gradually is reduced so as to correspondingly reduce the amount of deflection of the piezoceramic support device. When the oscillating signal finally is reduced to a minimum amplitude, such as zero, the piezoceramic support device will be at its neutral, or home position, and the remanence thereof will have been cancelled.

Figure 5A:
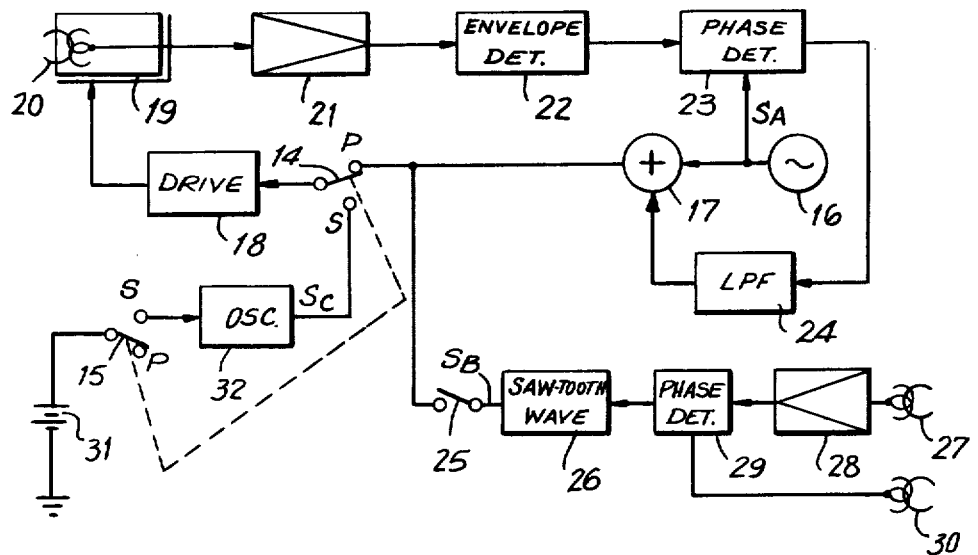
FIG. 5A is a block diagram of one embodiment of the present invention.

One example of circuitry which is readily adapted to carry out the foregoing principle is illustrated in FIG. 5A. To be complete, this illustrated circuitry also includes the tracking control circuitry which is used to supply the control voltage to the piezoceramic support device for dynamically adjusting the scanning trace of the head which is supported upon that device. The illustrated circuitry is comprised of a source of dither oscillating signal 16, an adder 17, a drive amplifier 18, piezoceramic support device 19, an envelope detector 22, a phase detector 23 and a low pass filter 24. Source 16, which may comprise a suitable oscillator, such as a crystal oscillator, having an appropriate oscillating frequency, generates dither oscillating signal $S_A$, referred to hereinafter merely as the dither signal. Source 16 is connected to adder 17 which is adapted to add a d.c. voltage level to dither signal $S_A$. This added d.c. voltage level is an error voltage which is produced as a function of the mis-tracking error of the head, shown in FIG. 5A as head 20, relative to the track being scanned thereby. The output of adder 17 is referred to as a tracking control signal and is supplied, via a change-over switch 14, to drive amplifier 18. This drive amplifier is connected to piezoceramic support device 19 and is adapted to supply the tracking control voltage thereto, whereby the piezoceramic support device deflects in a direction and by an amount determined by this tracking control voltage.

As head 20 scans the recording medium, assumed herein to be magnetic tape, the signals recorded on that medium are reproduced thereby. Let it be assumed that the video signals are recorded as frequency modulated (FM) signals. Hence, head 20 reproduces these FM video signals. The output of head 20 is supplied via a video amplifier 21 to an envelope detector 22. The envelope detector is adapted to determine whether head 20 is in proper or mis-tracking alignment with respect to the track being scanned thereby. That is, if the head is in proper alignment with the scanned track, the FM video signal reproduced by the head exhibits a maximum envelope. However, if the scanning trace of head 20 deviates from the record track, the envelope of the FM video signal is reduced. The output of envelope detector 22 is connected to one input of phase detector 23, and the other input of this phase detector is supplied with the dither signal $S_A$ from source 16. Any phase differential between the detected envelope and the dither signal is due to a mis-tracking error, and results in an output at the phase detector. This output is supplied through low pass filter 24 which, in turn, produces a d.c. error voltage which represents the mis-tracking error of head 20. This error voltage is supplied to adder 17 whereat it is added to the dither signal $S_A$ and supplied as a tracking control voltage to piezoceramic support device 19.

The output of video amplifier 21 also is supplied to a demodulator and video processing circuit (not shown) from which a video signal is derived for use either in broadcasting, monitoring, or the like.

Figure 6A:
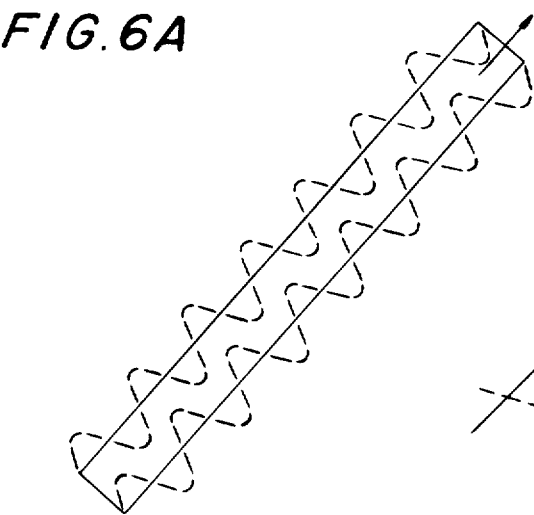
FIGS. 6A and 6B represent the proper, dithered tracking of a head along a record track.

The operation of the tracking control circuitry thus far described now will be described with reference to FIGS. 6A-6D. FIG. 6A represents the relationship between the scanning trace of head 20, shown in broken lines, and the track scanned thereby. It is appreciated that this scanning trace is oscillated, or dithered, in response to the dither signal $S_A$. Furthermore, it is assumed that, in FIG. 6A, the scanning trace is in alignment with the track. When the head is displaced to one side of the track, as when head 20 occupies the position shown as $H_A$, the envelope of the FM video signal reproduced by the head is at minimum level. This envelope is represented by the cross-hatched area at head location $H_A$. When the head is displaced to the other side of the track, as represented by head position $H_B$, the envelope of the FM video signal reproduced by the head once again is reduced to a minimum level, as represented by the cross-hatched area within head position $H_B$. It is appreciated that, for proper tracking of the head with respect to the track, that is, when the scanning trace of the head is in alignment with the track being scanned thereby, the envelope of the reproduced FM video signal is at the same minimum level at two positions during each cycle of the dither signal.

Figure 6B:
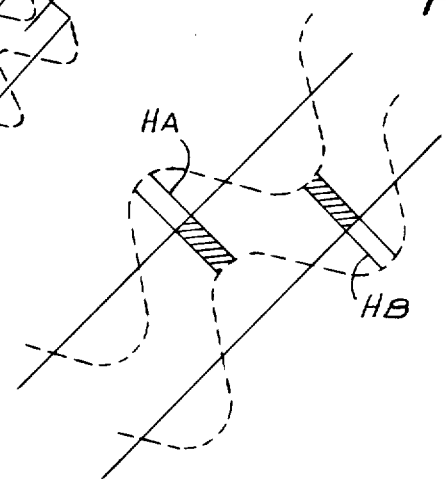
Figure 6C:
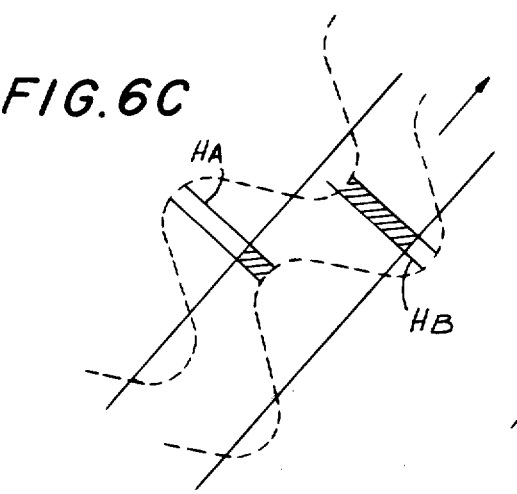
FIG. 6C represents a mis-tracking error in one direction between and head and the record track.

Let it be assumed that head 20 deviates from its proper tracking alignment so as to be displaced from the track as shown in FIG. 6C. Now, when head 20 occupies position $H_A$, the envelope of the FM video signal reproduced by head 20 is a minimum, as represented by the cross-hatched area at head position $H_A$. When the head reaches position $H_B$, the envelope of the FM video signal is less than its maximum level but, as shown by the cross-hatched area, this envelope is far greater than the envelope which is produced at head position $H_A$. It is appreciated, from FIG. 6C, that the envelope of the FM video signal which is reproduced by head 20 reaches its minimum level only once during each cycle of the dither signal. Thus, the frequency of the envelope waveform produced by head 20 when the head exhibits a tracking error is one-half the frequency of the envelope waveform for the condition that no tracking error is present.

Figure 6D:
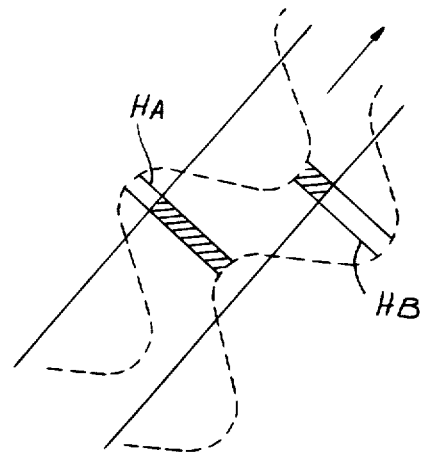
FIG. 6D represents a mis-tracking error in the opposite direction between the head and the record track.

If the tracking error between the head and the track is as shown in FIG. 6D, that is, if the head is displaced to the opposite side of the track, the waveform of the envelope of the FM video signal reproduced by head 20 is similar to the waveform of the envelope reproduced for the condition shown in FIG. 6C, except that the envelope waveform undergoes a phase shift. That is, in FIG. 6D, the envelope exhibits its minimum level at head position $H_B$. This compares to the envelope produced for the condition shown in FIG. 6C wherein the envelope is at its mimimum level at head position $H_A$. Hence, the envelope which is produced for the condition shown in FIG. 6D is shifted by 180° with respect to the envelope which is produced for the condition shown in FIG. 6C.

It may be appreciated that when head 20 is in proper tracking alignment with the track being scanned thereby, the envelope of the FM video signal which is reproduced by the head is in phase with the dither signal $S_A$. For the mis-tracking error condition shown in FIG. 6C, the envelope of the FM video signal reproduced by head 20 is out-of-phase with respect to the dither signal. This out-of-phase relation may, for example, be less than 180° and may be considered a positive phase displacement. The FM video signal reproduced by head 20 for the condition represented in FIG. 6D likewise is out-of-phase with respect to the dither signal. This out-of-phase relation may be greater than 180° and may be considered a negative phase displacement.

Returning now to FIG. 5A, envelope detector 22 produces the envelope of the FM video signal reproduced by head 20, samples of which are represented by the cross-hatched areas shown for head positions $H_A$ and $H_B$ in FIGS. 6B–6D. The phase of this envelope with respect to the dither signal $S_A$ is detected by phase detector 23 by using the dither signal as a detecting signal. The amplitude of the output of phase detector 23 is an error signal which represents the phase differential between the detected envelope of the FM video signal and the dither signal; and the polarity of this error signal represents the direction (e.g. positive or negative) of this phase displacement. Thus, it is seen that the magnitude of the error signal produced by phase detector 23 represents the amount of the mis-tracking error; and the polarity of this error signal represents the direction in which the mis-tracking error occurred. That is, if the head is misaligned above the track, as shown in FIG. 6C, the polarity of the error signal may be, for example, positive. Conversely, if the head is misaligned below the track, as shown in FIG. 6D, the polarity of the error signal may be assumed to be negative. This error signal is filtered to a d.c. level by low pass filter 24 and then is added to the dither signal $S_A$ to be supplied as a correcting signal, or tracking control signal, to piezoceramic support device 19.

Thus, although head 20 fluctuates, or oscillates, about its scanning path because of the dither signal $S_A$ which is supplied to piezoceramic support device 19 by oscillator 16, if this scanning path is, for example, displaced above the record track which is being scanned, as represented by FIG. 6C, phase detector 23 supplies a positive signal to low pass filter 24 which, in turn, adds a positive d.c. level to the dither signal in adder 17. The magnitude of this d.c. level represents the displacement of the actual scanning path of head 20 from its desired scanning path, i.e., from the track. Consequently, the tracking control voltage which is supplied to piezoceramic support device 19 from adder 17 appears as a dither signal superimposed onto a positive d.c. level. Piezoceramic support device 19 deflects downwardly in response to this positive d.c. level, thereby bringing the scanning path of head 20 into alignment with the track. Of course, the dither signal $S_A$ oscillates the head about its scanning path, as shown in FIG. 6A. Conversely, if head 20 exhibits a mistracking error in the downward direction relative to the track being scanned, as represented by FIG. 6D, phase detector 23 produces a negative signal which is supplied, by low pass filter 24, as a negative d.c. level to be added to the dither signal in adder 17. This negative d.c. level deflects piezoceramic support device 19 in the upward direction, thereby returning the scanning path of head 20 into alignment with the track. Of course, here too, the dither signal $S_A$ oscillates the head about its scanning path, as represented by FIG. 6A.

The tracking control circuitry thus far described is effective, generally, to adjust the position of head 20 relative to the track being scanned thereby during a normal reproducing operation. That is, in the aforedescribed operation, changeover switch 14 is conditioned such that its movable contact engages its playback contact P so as to couple the output of adder 17, that is, the d.c. level superimposed onto the dither signal $S_A$, to piezoceramic support device 19. The tracking control circuit includes an additional section which is operative during special reproducing modes of operation to compensate for mis-tracking errors of head 20. This additional section thus corrects tracking errors which may be present during, for example, slow motion, stop motion or quick motion modes. That is, if the scanning trace of head 20 deviates from the record track being scanned during such special reproducing modes, as represented by trace 12 shown in FIG. 3, this additional section of the tracking control circuit corrects for such deviation.

The aforementioned additional section of the tracking control circuit includes a sawtooth waveform generator 26 and a SPECIAL mode switch 25 (referred to hereinafter merely as the SPECIAL switch). Sawtooth waveform generator 26 generates a sawtooth shaped waveform of constant period and of an amplitude which is a function of the expected maximum deviation of the scanning trace of head 20 from the track being scanned. Since this deviation is a function of the speed at which the video tape is transported, the amplitude of the sawtooth shaped waveform is, therefore, a function of the tape speed. For example, and as shown in FIG. 3, scanning trace 12 deviates from desired scanning trace 13 by a greater amount during stop motion reproduction than during slow motion reproduction. Hence, the amplitude of the sawtooth shaped waveform generated by sawtooth waveform generator 26 should be greater during the stop motion mode than during the slow motion mode. A tape speed detecting circuit is connected to the input of sawtooth waveform generator 26 for supplying an amplitude control signal to the sawtooth waveform generator depending upon the detected tape speed.

In the illustrated embodiment, the tape speed detecting circuit is comprised of a pick-up head 27 adapted to reproduce the control pulses CT which are recorded along a longitudinal edge of tape T, as shown in FIG. 3, a sensor 30 which is adapted to generate a pulse whenever head 20 rotates into a predetermined position, and a phase detector 29 which is adapted to detect the phase differential between the control pulses CT reproduced by head 27 and the position pulses reproduced by sensor 30. More particularly, head 27 is connected to one input of phase detector 29 by an amplifier 28, and sensor 30 is connected to another input of the phase detector. Phase detector 29 supplies an amplitude control signal to sawtooth waveform generator 26; and this generator supplies its sawtooth shaped waveform to the output of adder 17 via SPECIAL switch 25.

During a normal reproducing mode, SPECIAL switch 25 is opened such that the sawtooth shaped waveform produced by sawtooth waveform generator 26 is not superimposed onto the output of adder 17. Furthermore, during this normal reproducing mode, the tape is transported at its normal speed such that a predetermined phase relation exists between control pulses CT reproduced by head 27 and the position pulses produced by sensor 30.

If the VTR now is disposed in one of its special reproducing modes, SPECIAL switch 25 is closed. Furthermore, the transport speed of the video tape is changed from its normal speed. This means that the predetermined phase relation between the control pulses CT reproduced by head 27 and the position pulses produced by sensor 30 no longer is present. This change in the phase relation between the control and position pulses is detected by phase detector 29 which, in turn, supplies an amplitude control signal to sawtooth waveform generator 26 which is a function of the tape transport speed during this special mode of reproduction. As a consequence thereof, the amplitude of the sawtooth shaped waveform produced by saw-tooth waveform generator 26 is set to a level which corrects the mistracking error of head 20. That is, the properly set amplitude of the sawtooth shaped waveform is superimposed with the tracking control voltage produced by adder 17 for the purpose of correcting the scanning trace of head 20, and thus bringing it into alignment with the track then being scanned during this special mode of reproduction. Change-over switch 14 now supplies a tracking control voltage to piezoceramic support device 19 which includes the dither signal component $S_A$, the d.c. level derived from phase detector 23 and the properly selected sawtooth shaped waveform $S_B$ produced by sawtooth waveform generator 26. These components combine to control head 20 such that the scanning trace thereof is brought into alignment with the track being scanned during the special mode of reproduction (e.g. the stop motion, the still motion or the quick motion modes), while head 20 continues to fluctuate, or oscillate, about its scanning trace, as shown in FIG. 6A.

Figure 7:
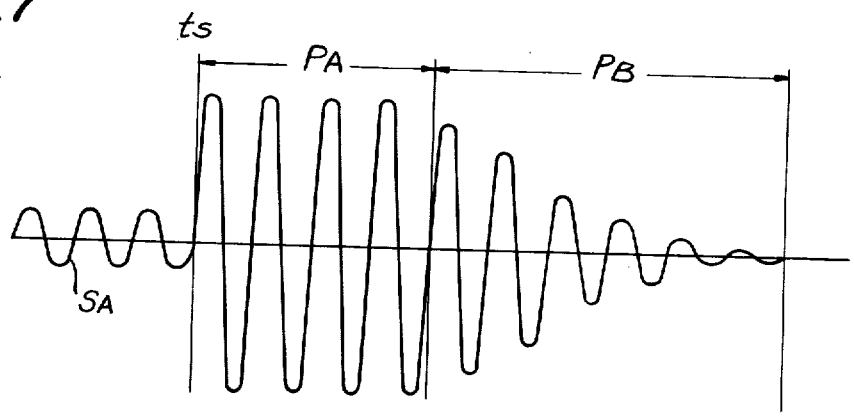
FIG. 7 is a waveform diagram of the oscillating signal which is used with the present invention.

In addition to the tracking control circuitry described hereinabove, FIG. 5A also includes an oscillator 32 which is selectively triggered when the VTR apparatus is changed over from its reproducing mode to a stand-by mode, the oscillating signal produced by this oscillator then being supplied to piezoceramic support device 19 for the purpose of cancelling the remanence thereof. Oscillator 32 may include a monostable multivibrator, or one-shot circuit, which is adapted to supply an operating voltage to the oscillator for a predetermined time duration, depending upon the time constant of the monostable multivibrator. In one embodiment, this monostable multivibrator may be of the type which generates a pulse signal having a substantially vertical leading edge and a gradually decaying trailing edge. When oscillator 32 is supplied with an operating voltage having this waveform, the oscillator generates an oscillating signal whose envelope is similarly shaped. That is, during the predetermined time duration determined by the monostable multivibrator, the oscillating signal exhibits a substantially fixed constant amplitude during a first portion of this time duration, and then the amplitude of the oscillating signal gradually decreases, a decays, during the following portion of the time duration. Such an oscillating signal having this envelope is illustrated in FIG. 7, wherein the fixed amplitude thereof is present during portion $P_A$, and the gradually decreasing amplitude thereof is present during portion $P_B$.

As another embodiment of oscillator 32, the operating voltage supplied thereto for the aforementioned predetermined time duration initially may exhibit a maximum level, and then the amplitude of this operating voltage may gradually decrease from this maximum level for the entire time duration. That is, in this alternate embodiment, the waveform of the oscillating signal may appear as shown in FIG. 7 during portion $P_B$. One of ordinary skill in the art would be fully enabled to produce an operating voltage having a wave shape similar to the envelope of the oscillating signal shown during portion $P_B$.

Oscillator 32, as shown in FIG. 5A, is coupled to a voltage supply source 31 by a change-over switch 15 which is mechanically ganged for simultaneous operation with change-over switch 14. In particular, when the movable contact of change-over switch 14 is in engagement with playback contact P, the movable contact of change-over switch 15 likewise is in engagement with its playback contact P, the latter being isolated from further circuitry. If change-over switch 14 is operated such that its movable contact engages its stand-by contact S, thereby coupling the oscillating signal $S_c$ produced by oscillator 32 to piezoceramic support device 19, the movable contact of change-over switch 15 likewise engages its stand-by contact S, thereby supplying the voltage from source 31 to oscillator 32. It is appreciated that the abrupt application of voltage from source 31 to stand-by-contact S of change-over switch 15 serves to trigger the monostable multivibrator included in oscillator 32 such that the oscillating signal generated by this oscillator at time $t_s$, that is, at the time that change-over switch 15 is changed over in this manner, appears as shown in FIG. 7. In the alternative embodiment of oscillator 32, described above, when change-over switch 15 is changed over to its stand-by condition, that is, when its movable contact is brought into engagement with its stand-by contact S, the voltage supplied from source 31 results in an operating voltage supplied to oscillator 32 having the gradually decreasing, or decaying shape of the type exhibited by the envelope of the oscillating signal shown during portion $P_B$ in FIG. 7.

Thus, in either embodiment of oscillator 32, when change-over switches 14 and 15 are changed over from their playback conditions to their stand-by conditions, the tracking control voltage which previously had been supplied to piezoceramic support device 19 from adder 17 is replaced by the oscillating signal generated by oscillator 32. That is, and as shown more clearly in FIG. 7, prior to time $t_s$, the VTR apparatus operates in its reproducing mode, such as its normal reproducing mode, whereby dither signal $S_A$ is supplied as the tracking control signal to piezoceramic support device 19. At time $t_s$, the VTR apparatus is changed over from its reproducing mode to its standby mode, whereby oscillating signal $S_c$ is supplied from oscillator 32 through change-over switch 14 to piezoceramic support device 19. It is fully appreciated that the magnitude of the oscillating signal $S_c$, when initially supplied to the piezoceramic support device at time $t_s$, is greater than the amplitude of the dither control signal $S_A$ which had been supplied to the piezoceramic support device. Even if the VTR apparatus had been operating in its special mode of reproduction, the amplitude of the overall tracking control signal which had been supplied to piezoceramic support device 19, that is, the amplitude of the sawtooth shaped waveform together with the superimposed d.c. level-adjusted dither signal, is less than the magnitude of the oscillating signal $S_c$.

When the oscillating signal $S_c$ is supplied to piezoceramic support device 19, the support device is driven through its hysteresis loop shown in FIG. 4. That is, its maximum positive deflection is dependent upon the magnitude of the oscillating signal $S_c$ during the positive half-cycle, and its maximum negative deflection is dependent upon the magnitude of the oscillating signal during its negative half-cycle. As the magnitude of the oscillating signal gradually is reduced, as during portion $P_B$, the positive and negative deflections of piezoceramic support device 19 likewise are reduced. That is, the hysteresis loop shown in FIG. 4 is made smaller. Finally, when the magnitude of the oscillating signal has been reduced to zero, the actual deflection of piezoceramic support device 19 likewise will have been reduced to zero. Hence, the remanence of the piezoceramic support device, which otherwise would prevent this device from returning to its home position in the absence of a voltage applied thereacross, is cancelled. Consequently, at the conclusion of the predetermined time duration following the change-over of switches 14 and 15 from their playback conditions to their standby conditions, head 20 will have returned to its home position.

Figure 8:
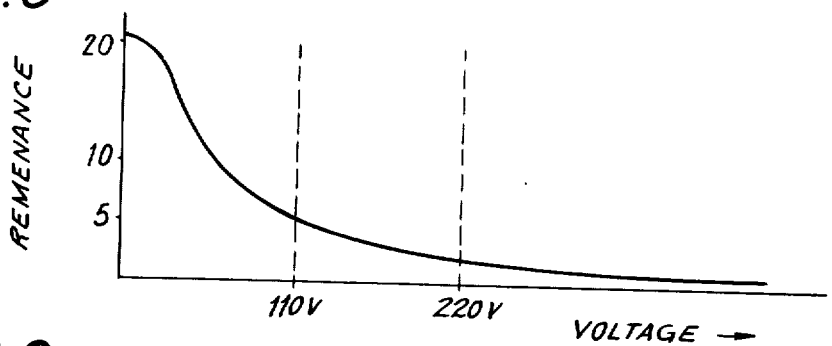
FIG. 8 is a graphical representation of the relationship between the remanence and the magnitude of the remanence-cancelling signal which is supplied to the piezoceramic support device.

The relationship between the cancellation of the remanence of the piezoceramic support device and the magnitude of the oscillating signal supplied thereto is graphically depicted in FIG. 8. In this graphical representation, the abscissa represents the magnitude of the oscillating signal and the ordinate represents the remanence. For the purpose of the present discussion, it will be assumed that the remanence is the amount of deflection of the piezoceramic support device in response to a zero voltage applied thereacross divided by the maximum deflection which the device may undergo. For the particular type of piezoceramic material which is used as the piezoceramic support device, it is assumed that the piezoceramic material exhibits a remanence of 20%, when the magnitude of the oscillating signal is zero. As the initial amplitude of the oscillating signal is raised beyond zero, the remanence is seen to decrease. Thus, if the initial amplitude of the oscillating signal is, for example, 110 volts, then, at the end of the forementioned predetermined time duration, that is, after the magnitude of this oscillating signal has been reduced to zero, the remanence is reduced to 5%. If the initial magnitude of the oscillating signal is increased to 220 volts, then, after the predetermined time duration during which the oscillating signal of gradually decreasing magnitude is applied, the remanence of the piezoceramic support device is reduced to about 2%. From FIG. 8, it is appreciated that, as the initial amplitude of the oscillating signal is increased further, a greater amount of remanence is cancelled thereby.

Figure 9:
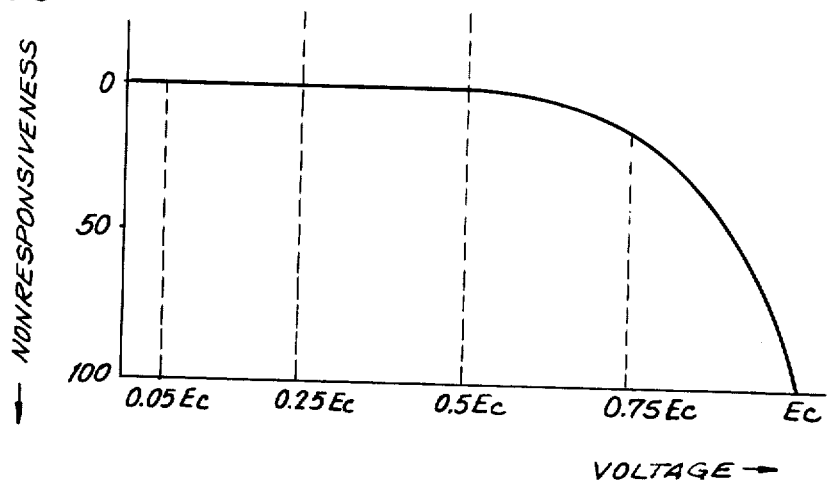
FIG. 9 is a graphical representation of the relationship between the responsiveness of a piezoceramic support device and the magnitude of the tracking control voltage supplied thereto.

The magnitude of the oscillating signal supplied to the piezoceramic support device cannot be raised beyond a threshold voltage $E_c$, now to be described with reference to the graphical representation shown in FIG. 9. This graphical representation illustrates the relationship between the non-responsiveness of the piezoceramic material to a control voltage applied thereacross when the control voltage is of a relatively high level. If the polarity of the control voltage is opposite to the polarization of the piezoceramic material, the material will be subjected to expanding forces similar to those which are present in piezoceramic member 34, discussed previously with respect to FIG. 1. It is recalled that these forces result in the deflection of the piezoceramic support device. Generally, the amount of such deflection, that is, the responsiveness of the piezoceramic support device, is related to the magnitude of the voltage applied thereacross. However, for higher voltage levels, the responsiveness of the piezoceramic material is reduced. Finally, for a threshold level $E_c$, the value of which is established by the piezoceramic material, the piezoceramic support device is fully non-responsive. FIG. 9 represents the non-responsiveness of the piezo-ceramic material to the magnitude of the voltage applied thereacross. In particular, the abscissa of this graphical representation represents the magnitude of the applied voltage, and the ordinate represents the percentage of non-responsiveness. It is seen that, at the threshold voltage $E_c$, the piezoceramic support device is fully (i.e., 100%) non-responsive. For a voltage whose magnitude is 0.5 $E_c$ or less, the piezoceramic support device is fully responsive (i.e., 0% non-responsive). Between the range $0.5E_c$ and $E_c$, the non-responsiveness of the piezoceramic material increases from 0% to 100%.

In selecting the magnitude of the oscillating signal which initially is supplied to piezoceramic support device 19 when change-over switch 15 is changed over from its playback condition to its stand-by condition, the graphical representations of both FIGS. 8 and 9 must be taken into account. As shown in FIG. 8, if the magnitude of this oscillating signal is selected to be high, the amount of remanence which remains is very low. However, as represented by FIG. 9, if the amplitude of the oscillating signal is selected to be too high, the characteristics of the piezoceramic support device may be substantially disturbed such that the device no longer is satisfactorily responsive to a tracking control voltage applied thereacross. That is, the non-responsiveness shown in FIG. 9 may be considered to be permanent, even after the oscillating signal is removed. Hence, if the magnitude of the oscillating signal is equal to $E_c$, the piezoceramic support device will be permanently non-responsive to control voltages, even of very small magnitude, subsequently applied thereacross.

In view of the constraints presented by FIGS. 8 and 9, the preferred range of the magnitude of the oscillating signal $S_c$ which initially is supplied to piezoceramic support device 19 is between $0.25E_c$ and $0.75E_c$. If the characteristics of FIGS. 8 and 9 are drawn for the same piezoceramic material, then $0.25E_c = 110v$, and $0.75E_c = 330v$, wherein $E_c = 440v$. This range of the magnitude of the oscillating signal is seen to be much greater than the level of the dither signal $S_A$ which is supplied to piezoceramic support device 19 during reproducing modes of operation, which dither signal level is on the order of about $0.05E_c$.

The relationship between the non-responsiveness of the piezoceramic support device as a function of the voltage applied thereacross, as shown in FIG. 9, has been prepared as a result of experimentation wherein each test voltage was applied across the piezoceramic leaf member for about 500 hours. After each test voltage was removed, the piezoceramic leaf member was tested to determine its responsiveness to a control voltage. The results of this experimentation are represented by the graph of FIG. 9.

By selecting the magnitude of the oscillating signal $S_c$ to be within the range $0.25E_c$ to $0.75E_c$, wherein $E_c$ is the threshold voltage associated with the particular piezoceramic material which is used, it is seen that most of the remanence of the piezoceramic support device is cancelled, and the piezoceramic support devices is made only slightly non-responsive to subsequent control voltages by reason of the higher magnitude of the oscillating signal. In selecting the desired magnitude of the oscillating signal, it must be remembered that a greater amount of remanence can be cancelled only at the cost of increasing the non-responsiveness of the piezoceramic support device to subsequently applied tracking control voltages. Of course, regardless of the particular magnitude of the oscillating signal which is selected, this magnitude should be substantially greater than the level of the tracking control signal, as represented by FIGS. 7 and 9.

Figure 5B:
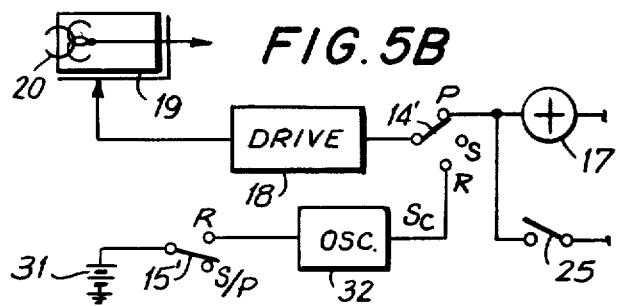
FIG. 5B is a block diagram of another embodiment of the present invention.

The embodiment of FIG. 5A represents the manner in which oscillator 32 is used to cancel the remanence of piezoceramic support device 19 when the VTR apparatus is changed over from its reproducing mode to its stand-by mode. Referring now to FIG. 5B, the embodiment illustrated therein represents the manner in which oscillator 32 is used to cancel the remanence of piezoceramic support device 19 when the VTR apparatus is changed over either from its reproducing mode or from its stand-by mode to its recording mode. The elements illustrated in FIG. 5B which are similar to those described hereinabove with respect to FIG. 5A are identified by the same reference numerals. The only differences reside in that change-over switch 14' (FIG. 5B) includes an additional contact, referred to as its record contact R, connected to the output of oscillator 32. Furthermore, stand-by contact S is electrically isolated. This differs from the aforedescribed embodiment of FIG. 5A wherein change-over switch 14 does not include the record contact R and, moreover, has its stand-by contact S connected to the output of the oscillator 32. Furthermore, in FIG. 5B, change-over switch 15' has a record contact R connected to the input of oscillator 32, and its movable contact is in engagement with the electrically isolated contact (S/P) either during the stand-by mode or during the playback mode. In all other respects, the apparatus illustrated in FIG. 5B functions in the same manner as discussed previously with respect to FIG. 5A. Thus, when the VTR apparatus of FIG. 5B is in its playback mode, the tracking control signal, discussed above, is supplied to piezoceramic support device 19. When the VTR apparatus is changed over to its recording mode, oscillator 32 is triggered to generate the oscillating signal $S_c$, discussed previously, and having a waveform of the type shown by the example of FIG. 7. In the record mode, the output of oscillator 32 is coupled via change-over switch 14' to drive amplifier 18, whereby the oscillating signal $S_c$ is supplied to piezoceramic support device 19 for removing the remanence thereof during the initial portion of the recording mode. At the end of the predetermined time duration, that is, when oscillating signal $S_c$ has decayed to zero, video signals then can be recorded on the record medium by head 20 with uniform pitch. The embodiment discussed with respect to FIG. 5B is particularly beneficial when the VTR apparatus is operated in an edit operation.

It is, of course, appreciated that in the embodiment of FIG. 5B, the oscillating signal $S_c$ is supplied to piezoceramic support device 19 when the VTR apparatus is changed over from its playback mode to its recording mode or from its stand-by mode to its recording mode. That is, a predetermined time duration at the initial portion of the recording mode is dedicated to cancelling the remanence of piezoceramic support device 19.

While the present invention has been particularly shown and described with reference to preferred embodiments, it should be readily apparent to those of ordinary skill in the art that various changes and modifications in form and details may be made without departing from the spirit and scope of the invention. For example, the apparatus with which the present invention can be used need not be limited solely to a video recorder, such as a VTR. The present invention can be used with other recording and/or reproducing devices in which a piezoceramic support device is used to scan a transducer across a record medium. The record medium need not be a magnetic tape, nor need this medium be limited to a magnetic recording medium. Furthermore, the tracking control circuitry need not be limited solely to the type shown in FIG. 5A and comprising dither signal source 16, envelope detector 22, phase detector 23, and sawtooth waveform generator 26.

It is intended that the claims be interpreted as including the foregoing as well as other changes and modifications.

What is claimed is:

1. Apparatus for recording and/or reproducing information on a record medium in parallel skewed tracks and operative in selected operating modes, said apparatus comprising at least one transducer for scanning successive traces across said record medium; piezoceramic support means for supporting said at least one transducer and responsive to a signal applied thereto to deflect so as to correspondingly displace said transducer in a direction transversely of said scanning trace; means for supplying a tracking control signal to said piezoceramic support means during selected operating modes; a source of oscillating signal of magnitude substantially greater than the magnitude of said tracking control signal; and means responsive to a change-over between selected operating modes of said apparatus for supplying said oscillating signal to said piezoceramic support means for a predetermined duration during which the magnitude of said oscillating signal gradually reduces from a maximum amplitude to a minimum amplitude.

2. The apparatus of claim 1 further comprising change-over switch means having a first condition for establishing a reproducing operating mode during which said tracking control signal is supplied to said piezoceramic support means and said oscillating signal is not supplied thereto, and a second condition for establishing a stand-by operating mode during which information is neither recorded nor reproduced and said oscillating signal is supplied to said piezoceramic support means for said predetermined duration and said tracking control signal is not supplied thereto.

3. The apparatus of claim 2 wherein said means for supplying a tracking control signal comprises a source of dither oscillating signal having a reference level about which the dither signal oscillates; means for sensing a tracking error between the scanning trace of said transducer and a record track being scanned thereby; and means for adjusting said reference level of said dither signal as a function of said tracking error, said dither signal being supplied to said piezoceramic support means when said change-over switch means is in its first condition.

4. The apparatus of claim 3 wherein said means for sensing a tracking error comprises envelope detecting means for detecting the envelope of the signal reproduced by said transducer; phase detecting means having respective inputs coupled to said envelope detecting means and to said source of dither signal for detecting a phase difference therebetween, said phase difference representing said tracking error; and filter means coupled to the output of said phase detecting means for producing a d.c. level as determined by said phase difference.

5. The apparatus of claim 3 or 4, wherein said means for supplying a tracking control further comprises sawtooth wave generating means for generating a sawtooth waveform whose amplitude is a function of the type of reproducing operating mode which is established; and means for modulating said dither signal onto said sawtooth waveform before said dither signal is supplied to said piezoceramic support means.

6. The apparatus of claim 2 wherein said source of oscillating signal comprises means responsive to said second condition of said change-over switch means to generate said oscillating signal of constant magnitude for a first time interval and then to gradually reduce said magnitude of said oscillating signal substantially to zero during a following second time interval.

7. The apparatus of claim 1 further comprising change-over switch means having a first condition for establishing a recording operation mode normally during which neither said tracking control signal nor said oscillating signal is supplied to said piezoceramic support means, and a second condition for establishing either a reproducing operating mode during which only said tracking control signal is supplied to said piezoceramic support means or a stand-by mode during which neither said tracking control signal nor said oscillating signal is supplied to said piezoceramic support means; and means for supplying said oscillating signal to said piezoceramic support means for said predetermined duration immediately following the changing over of said change-over switch to its first condition.

8. The apparatus of claim 7 wherein said source of oscillating signal comprises means responsive to the changing over of said change-over switch to its first condition to generate said oscillating signal of constant magnitude for a first time interval and then to gradually reduce said magnitude of said oscillating signal substantially to zero during a following second time interval.

9. The apparatus of claim 1 wherein said piezoceramic support means is responsive to a voltage less than a maximum amplitude $E_c$ beyond which maximum amplitude said piezoceramic support means no longer responds; and wherein said maximum amplitude of said oscillating signal is less than $E_c$.

10. The apparatus of claim 9 wherein said maximum amplitude of said oscillating signal is within the range $0.25E_c$ to $0.75E_c$.

11. For use in a video tape recorder having a reproducing mode of operation wherein video signals recorded in parallel skewed tracks on magnetic tape are reproduced, a stand-by mode of operation, and/or a recording mode of operation wherein video signals are recorded in said parallel skewed tracks, said video tape recorder having at least one transducer for scanning successive traces across said tape, apparatus comprising piezoceramic support means for supporting said at least one transducer and responsive to a signal of less than a threshold magnitude $E_c$ applied thereto to deflect so as to correspondingly displace said transducer in a direction transversely of said scanning trace; means for supplying a tracking control signal to said piezoceramic support means during said reproducing mode of operation, said piezoceramic support means normally exhibiting a remanent deflection when said tracking control signal is removed therefrom; a source of oscillating signal of magnitude substantially greater than the magnitude of said tracking control signal but less than $E_c$; and means responsive to a change-over from said reproducing mode of operation to said stand-by mode, or to a change-over to said recording mode of operation of said video tape recorder for supplying said oscillating signal to said piezoceramic support means for a predetermined duration, the magnitude of said oscillating signal being gradually reduced from its maximum amplitude to a minimum amplitude during at least a portion of said predetermined duration; whereby said remanent deflection of said piezoceramic support means is substantially cancelled.

12. The apparatus of claim 11 wherein said means for supplying said oscillating signal to said piezoceramic support means comprises change-over switch means having a first condition for supplying said tracking control signal to said piezoceramic support means during said reproducing mode of operation and a second condition for supplying said oscillating signal to said piezoceramic support means during said stand-by mode of operation.

13. The apparatus of claim 11 wherein said means for supplying said oscillating signal to said piezoceramic support means comprises change-over switch means having a first condition operative in a reproducing or stand-by mode of operation, and a second condition operative in a recording mode of operation for supplying said oscillating signal to said piezoceramic support means during the commencement of said recording mode of operation.

14. The apparatus of claim 12 or 13 wherein said source of oscillating signal comprises an oscillator; and a switch operative with said change-over switch means to trigger said oscillator for said predetermined duration when said change-over switch means is changed over to its second condition.

15. The apparatus of claim 14 wherein said source of oscillating signal further comprises monostable multivibrator means for supplying an operating voltage to said oscillator when said switch is operated, said operating voltage having a constant level for a first time interval and a gradually decreasing level for a second time interval during which the magnitude of said oscillating signal also decreases.

16. The apparatus of claim 15 wherein the maximum amplitude of said oscillating signal is within the range of $0.25E_c$ to $0.75E_c$.

17. A method of cancelling remanent deflection in a piezoceramic support device for a transducer which is used to scan successive traces across a recording medium in a video signal recording and/or reproducing apparatus, said apparatus having a recording mode, a stand-by mode and a reproducing mode, wherein a tracking control signal is supplied to the piezoceramic support device during the reproducing mode to minimize mis-tracking of the transducer; said method comprising the steps of supplying an oscillating signal to said piezoceramic support device for a predetermined duration when said apparatus is changed over to its stand-by mode and/or when said apparatus is changed over to its recording mode, the magnitude of said oscillating signal being less than $E_c$, wherein $E_c$ is the largest magnitude of the tracking control signal to which said piezoceramic support device responds; and gradually reducing the magnitude of said oscillating signal to a minimum level during said predetermined duration.

18. The method of claim 17 wherein said oscillating signal has a fixed magnitude for a first portion of said predetermined duration, and a gradually reducing magnitude for a following portion of said predetermined duration.

19. The method of claim 17 wherein said oscillating signal has a gradually reducing magnitude throughout the entirety of said predetermined duration.

20. The method of claim 17 wherein the maximum magnitude of said oscillating signal is within the range $0.5E_c$ to $0.75E_c$.

* * * * *